(12) United States Patent
Knight (10) Patent No.: US 6,827,846 B2
(45) Date of Patent: Dec. 7, 2004

(54) FILTER ELEMENT CHANGE INDICATOR HANDLE

(75) Inventor: Steven R. Knight, Modesto, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/915,159

(22) Filed: Jul. 25, 2001

(65) Prior Publication Data

US 2003/0019801 A1 Jan. 30, 2003

(51) Int. Cl.[7] .............................................. B01D 35/143
(52) U.S. Cl. ......................... 210/90; 210/94; 210/238; 210/438; 210/442; 210/470; 116/272
(58) Field of Search .................... 210/90, 438, 441, 210/442, 94, 238, 470; 116/70, 272, 283, DIG. 42, 266, 268, DIG. 25; 55/DIG. 34; 96/421

(56) References Cited

U.S. PATENT DOCUMENTS

| | | | |
|---|---|---|---|
| 2,638,581 A | * | 5/1953 | Marvel ........................ 340/607 |
| 2,669,707 A | * | 2/1954 | Ehrman ....................... 340/607 |
| 2,879,892 A | * | 3/1959 | Frakes ......................... 210/90 |
| 3,068,831 A | | 12/1962 | Witchell |
| 3,487,929 A | | 1/1970 | Sample et al. |
| 3,493,110 A | | 2/1970 | Rosaen |
| 3,508,657 A | * | 4/1970 | Cooper ........................ 210/90 |
| 3,812,816 A | | 5/1974 | Juhasz |
| 5,616,157 A | | 4/1997 | Mead et al. |
| 5,845,597 A | | 12/1998 | Karpal |

* cited by examiner

Primary Examiner—Matthew O. Savage
(74) Attorney, Agent, or Firm—Christopher H. Hunter (57) ABSTRACT

A T-handle for a filter includes an integral mechanical indicator. The T-handle indicator has a threaded portion that extends through a hole in the filter cover and retains the cover to a canister. The indicator includes a spring-biased button that provides a visual indication of whether the element needs to be replaced. The button is received in a body that is open to the pressure on the downstream side of the filter element. A pair of clips on the button engage the indicator body to retain the button in the inward (element change) position. The clips can be accessed when the T-handle indicator is removed from the filter to return the button to the outward (fresh element) position. The indicator button includes an axially-elongated slot extending radially through the button, and the body includes a corresponding pair of holes on opposite sides of the slot. A handle rod for rotating the T-handle projects through the holes in the body, and the button is constrained by the rod as the button slides within the body.

42 Claims, 7 Drawing Sheets

FILTER ELEMENT CHANGE INDICATOR HANDLE

FIELD OF THE INVENTION

The present invention relates generally to filters for fluid filtration.

BACKGROUND OF THE INVENTION

A filter is typically provided in a fluid system to remove particulate and other contaminants before the fluid reaches a sensitive component, such as a combustion chamber, pump, compressor, etc. Many times the filter incorporates an element that is replaceable, such that a spent element can be replaced with a fresh element. The operator can either remember to change the element after, e.g., a certain number of operating hours or miles (in the case of an automobile); and/or electronic and mechanical sensors can be provided to visually or audibly notify an operator of the need for a filter change.

Examples of mechanical indicators for filters are shown in U.S. Pat. Nos. 3,068,831 and 3,812,816. In these references, a button is slideably received in a body. The body has an internal chamber that is open to the clean (downstream) side of the element. The button is normally spring-biased into an outward (clean element) position which can be confirmed by visually inspecting the button. When the media becomes clogged, the pressure on the downstream side of the element decreases as the system attempts to pull fluid through the filter. When the pressure decreases above the force of the spring (which can be appropriately chosen), the button is pulled inwardly into the body. The difference in the button position can alert the operator to an element change. The button and/or body can also incorporate colors, which visually change as the button is retracted to facilitate identifying the need for an element change. A clip, tab or other device on the button can engage the body to maintain the button in its retracted position when the engine or fluid system is shut-down to facilitate confirming the location of the button. The button can then be reset when the element is changed.

The mechanical indicator can be located at a number of different locations on the housing. One common location is in the cover of the canister. The indicator, however, must share space with other devices mounted to the cover. With a trend toward smaller filters, space can be at a premium in many applications. In addition, some covers are attached to the filter canister by a T-handle (see, e.g., U.S. Pat. No. 3,493,110). The T-handle has a threaded portion that extends through an opening in the cover and screws down into a central tubular member or standpipe projecting from the opposite end of the canister. Such a T-handle allows easy attachment and removal of a cover, but limits the ability to mount other devices on the cover, as the outwardly-projecting handle must be free from obstruction in order to grasp and rotate the handle.

U.S. Pat. No. 3,493,110 shows a mechanical indicator and a T-handle located on the cover of a filter. The indicator has a rotating pointer and is mounted separately from the handle. While the indicator has a low profile such that the handle can be rotated, Applicants believe the operator's hand can still encounter the indicator if the operator is not careful, and it can be burdensome and somewhat uncomfortable to rotate the handle to remove and attach the cover.

Applicants believe most mechanical indicators have heretofore been a component separate from the T-handle. One reason may be that the mechanical indicator has included complex, somewhat fragile components which are necessary to provide accurate and repeatable sensing of pressure. Such components typically cannot withstand abuse or repeated handling. The handle, on the other hand, must be a robust component able to withstand repeated grasping and turning by the operator. It is believed these contrasting requirements have necessitated mounting the indicator separately from the handle.

Applicants thereby believe there is a demand for an improved mechanical indicator, particularly useful with filters incorporating T-handles, which overcomes many, if not all, of the drawbacks noted above.

SUMMARY OF THE PRESENT INVENTION

The present invention provides an improved mechanical indicator for a filter, which conserves space on the cover for the filter, and which does not interfere with the operation of a T-handle.

According to the present invention, the mechanical indicator is incorporated into the T-handle as an integral indicator handle assembly. The indicator handle assembly includes a body with a handle portion and a mechanical indicator portion. The handle portion has a threaded collar that can be inserted through an opening in the cover and screwed down into a central standpipe in the filter. The handle portion further includes a handle rod supported transversely in the body to facilitate grasping and turning the indicator handle assembly.

The mechanical indicator portion of the assembly includes a button that is normally spring-biased outwardly in the body to provide a visual indication that the element is fresh. The button is located in a central chamber of the body that is open to the downstream side of the filter element. When the element becomes spent during operation of the fluid system, the pressure on the downstream side of the element drops, which causes the button to move inwardly in the body against the spring. A pair of clips engage the indicator body as the button is retracted to retain the button in the inward (spent element) position. When the indicator handle assembly is unscrewed from the canister and removed during an element change, the clips can be squeezed together to allow the indicator button to move back to its normal (fresh element) position.

A transparent cap is provided on the indicator body. The button can have a colored end that is visible through the cap to facilitate confirming the position of the button.

The integral T-handle and mechanical indicator is robust and strong, and able to withstand repeated use. The assembly uses only few components, which minimize assembly time and effort, and which prolong the useful life of the handle indicator. Preferably the indicator button includes an axially elongated slot extending radially through the button, and the body includes a corresponding pair of circular openings on opposite sides of the slot. The handle rod projects through the openings in the body and through the slot in the button, and is retained in the openings such as by press-fit. The button is constrained by the movement of the rod in the slot as the button moves axially within the body. The handle rod thereby serves the dual function of i) rotating the indicator handle assembly, and ii) locating and guiding the indicator button.

During assembly, a bias spring and wiper seal are first inserted through the upper open end the indicator body. A retainer cup can be provided to support the wiper seal. The button is then located in the body, with the clips of the button projecting downwardly into the threaded collar. The handle rod is then inserted radially through the openings in the indicator body, and through the slot in the button. The cap is then attached to the upper end of on the body to enclose the button, spring and wiper seal. The indicator handle assembly of the present invention is thereby easy to assemble, as well as to disassemble for inspection and repair.

Thus, the integral indicator handle assembly combines the usefulness of a T-handle to allow attachment of a cover to a filter canister, with a mechanical indicator to provide an indication of when a filter element needs to be replaced. The device is robust and strong, and capable of long-term use.

Further features of the present invention will become apparent to those skilled in the art upon reviewing the following specification and attached drawings.

DETAILED DESCRIPTION OF THE PREFERRED EMBODIMENT

Figure 1:
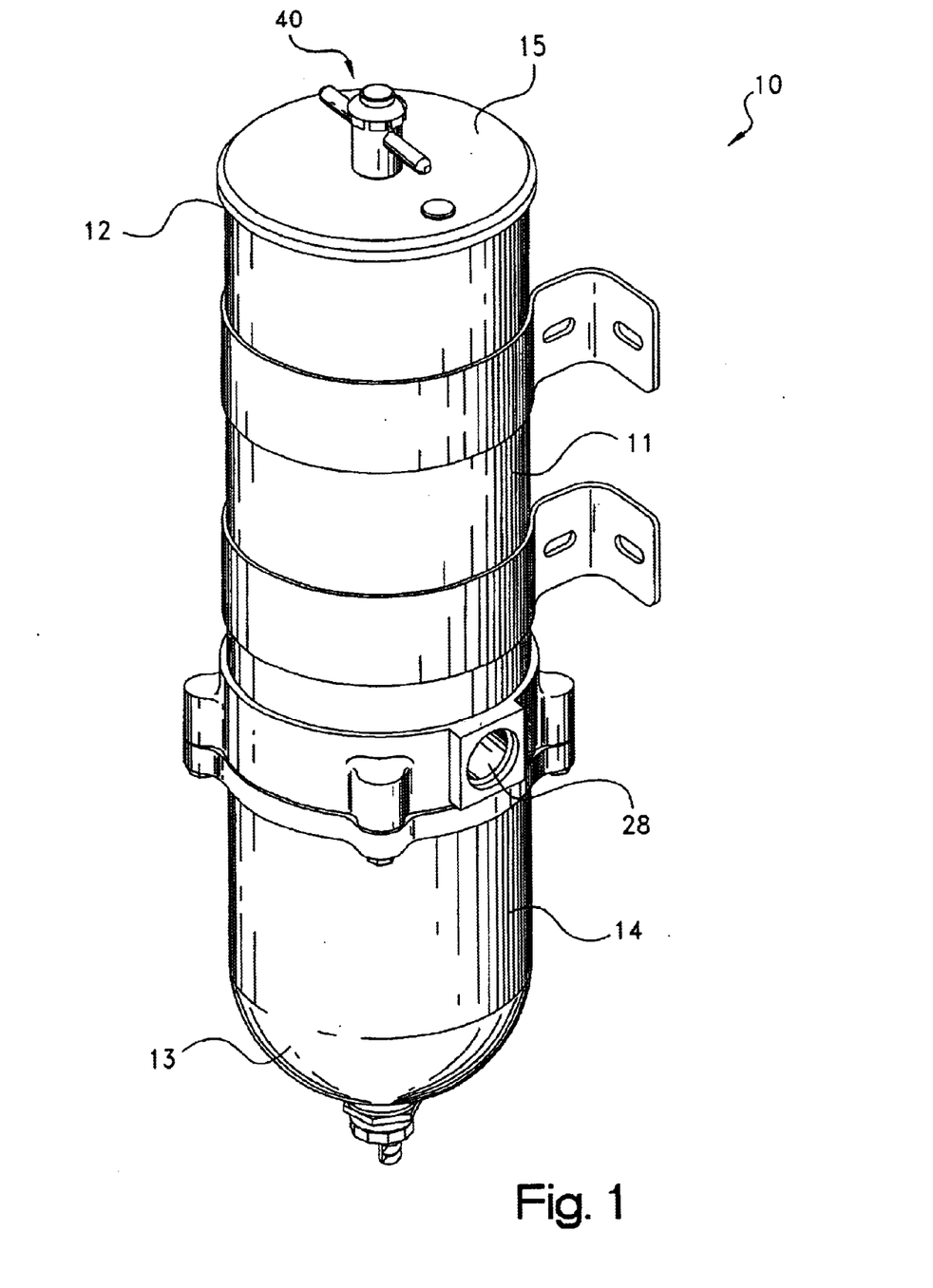
FIG. 1 is an elevated perspective view of the indicator handle assembly of the present invention, shown attached to a filter.
Figure 2:
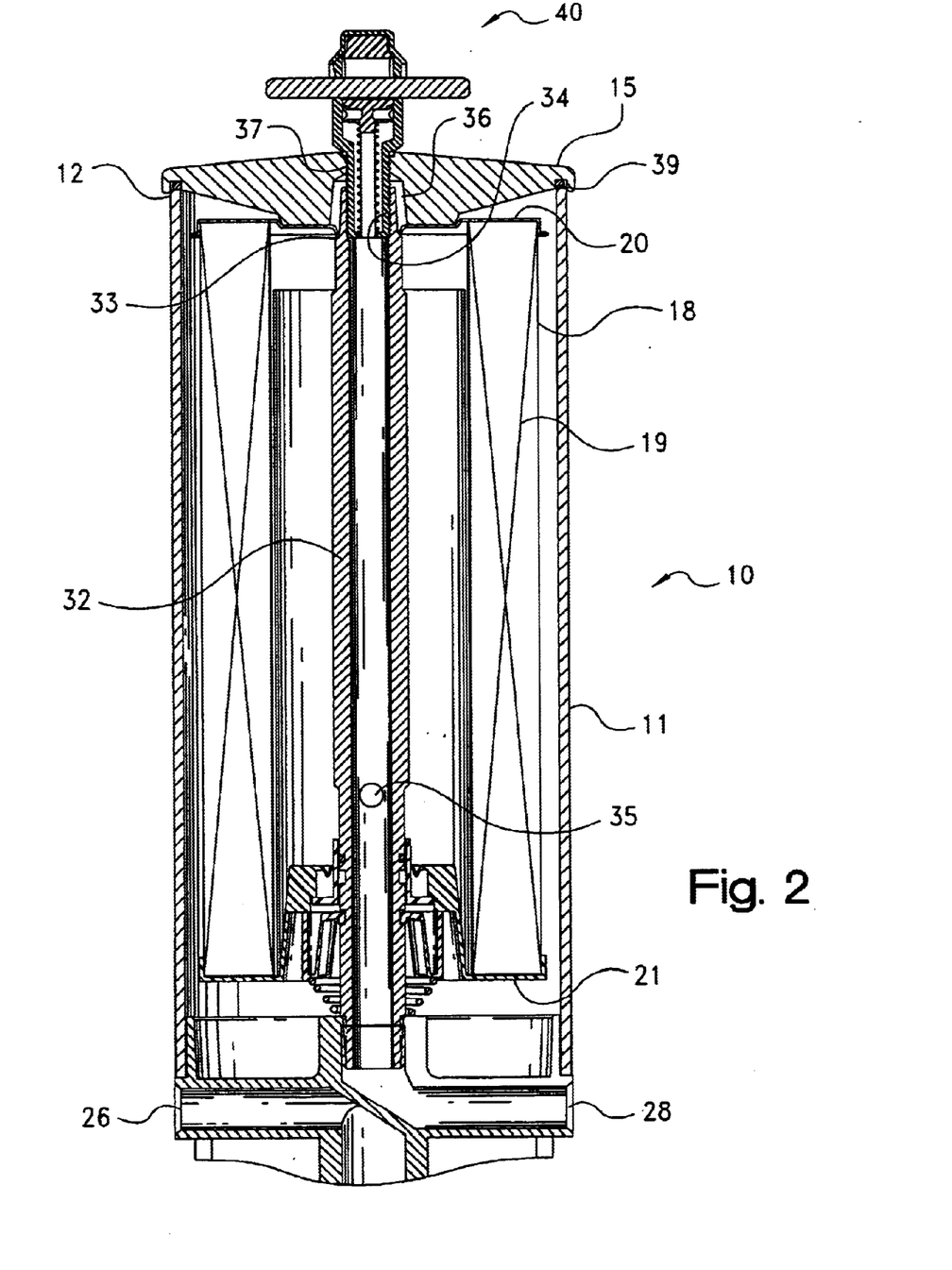
FIG. 2 is a cross-sectional side view of a portion of the indicator handle assembly and filter of FIG. 1.

Referring to the drawings, and initially to FIGS. 1 and 2, a filter is shown generally at 10 having a canister 11 with an open end 12 and a closed end 13. The closed end of the canister preferably includes a removable cup-shaped collection bowl 14. A disk-shaped cover 15 can be removably attached to the open end of the canister to allow easy access to a filter element 18. Filter element 18 can be any type of element suitable for the particular application, and preferably has a generally ring-shaped media 19, with end caps 20, 21 at either end. An inlet port 26 and outlet port 28 are provided in canister 12, to direct fluid to be filtered into the canister, and to discharge filtered fluid from the canister.

A central standpipe 32 is attached to and projects axially upwardly from the closed end 13 of the canister 11, through the center of filter element 18, and toward the open end 12. The standpipe terminates at a distal free end 33, which has an internal threaded portion 34. An opening 35 is provided along the length of the standpipe. End caps 20, 21 of element 18 are sealed to the standpipe to fluidly seal the clean side of the element from the dirty side.

The cover 15 for the canister has a central through bore or opening 36, which generally corresponds to the location of the standpipe 32, and which has a portion 37 with internal threads. Standpipe 32 preferably extends axially upwardly through a portion of bore 36. An appropriate O-ring seal 39 is provided between the cover and the canister. While one exemplary type of canister, cover and element is shown and described, it is important to note that the filter could have many variations depending on the particular application. Resort may be had to U.S. Pat. No. 3,931,011, and to U.S. patent application Ser. No. 09/452,857 filed Dec. 3, 1999 for "Fuel filter With Keyed Latch Valve", both of which are incorporated herein by reference, for further descriptions of the filter element and some of the internals of a filter canister that are appropriate for the present invention. It should be appreciated that the filter of the present invention is useful for many types of applications and is typically used to filter diesel fuel in automotive and truck applications.

Figure 3:
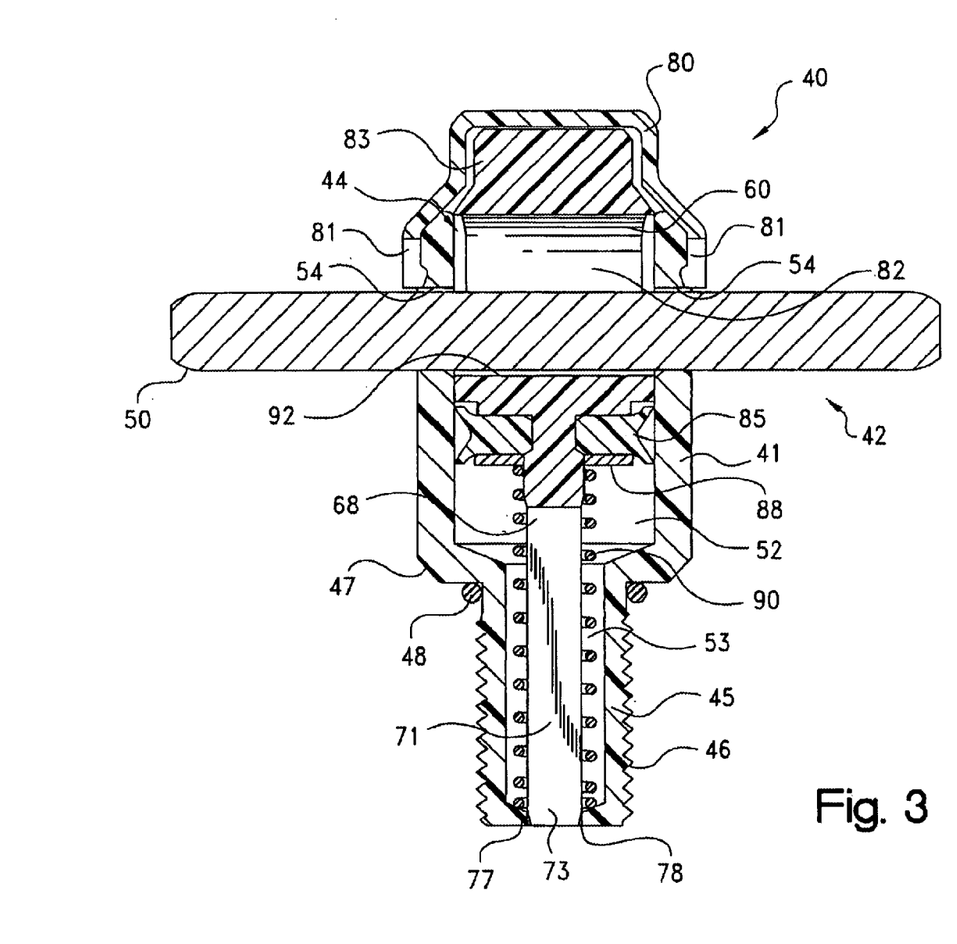
FIG. 3 is a cross-sectional enlarged side view of the indicator handle assembly, with the indicator shown in a fresh element position.
Figure 4:
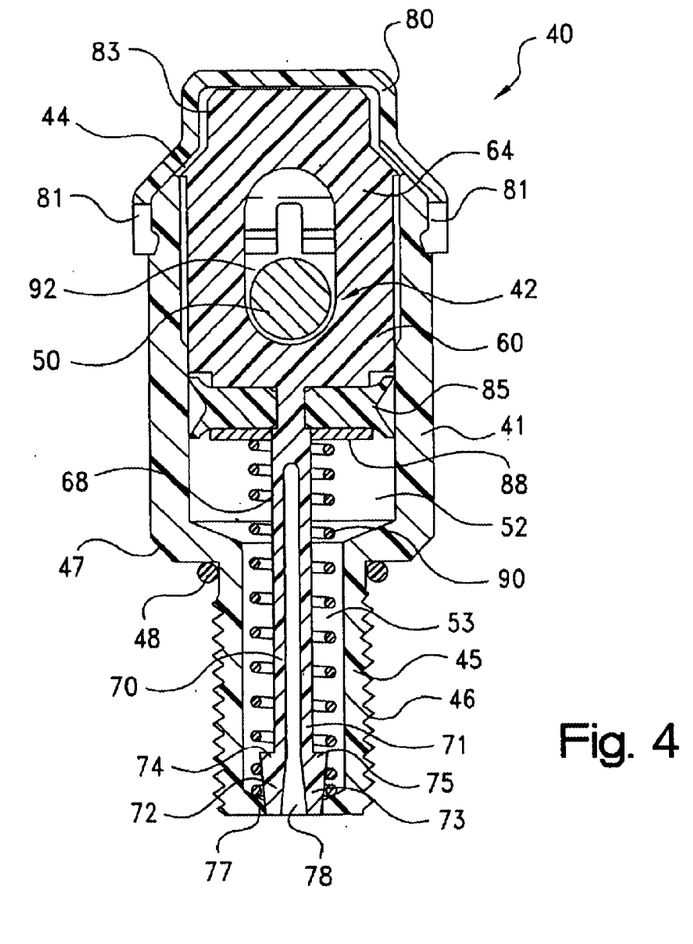
FIG. 4 is a cross-sectional enlarged side view of the indicator handle assembly of FIG. 3, shown rotated ninety degrees.
Figure 5:
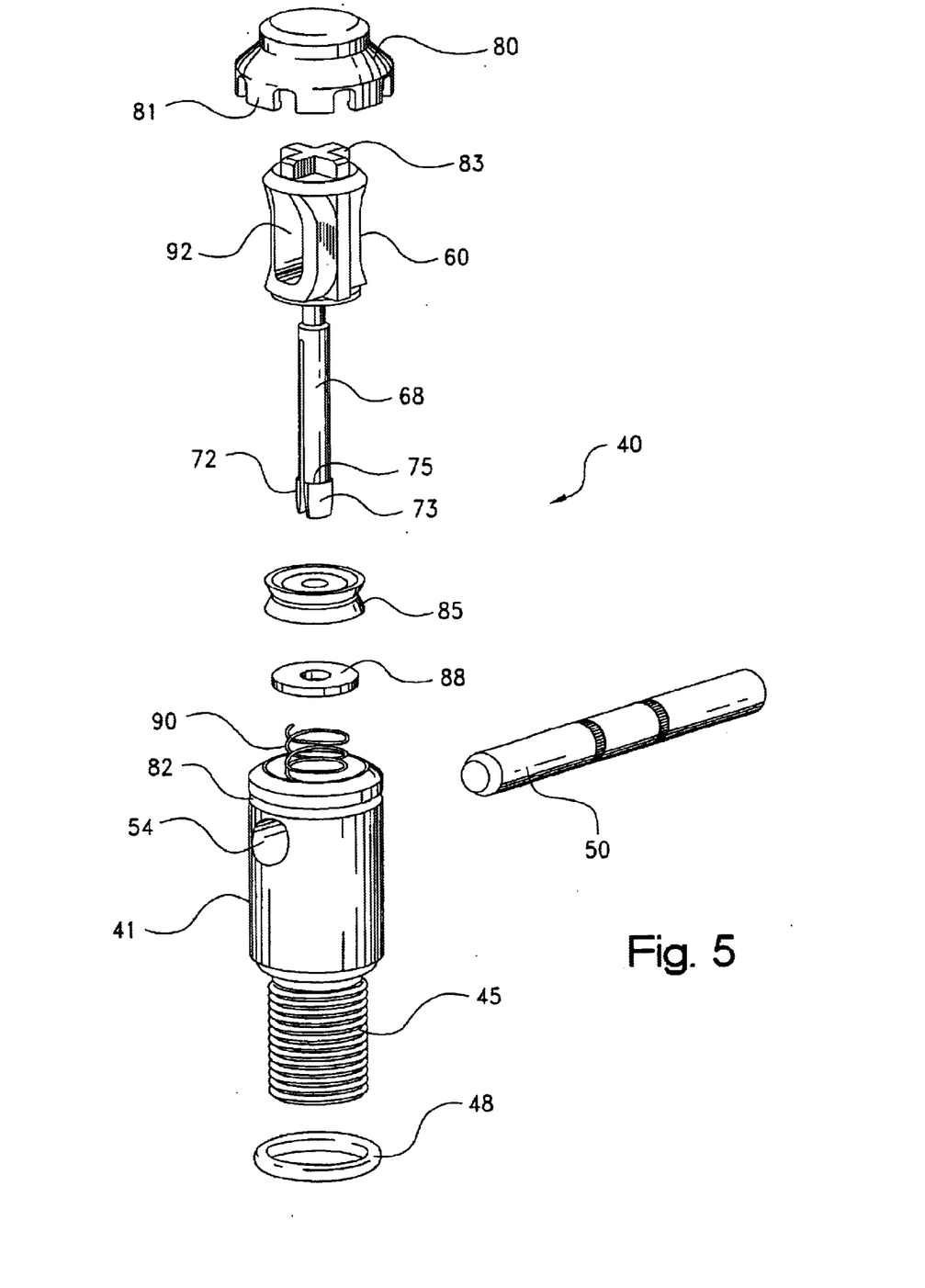
FIG. 5 is an exploded view of the indicator handle assembly.

An indicator handle assembly, indicated generally at 40, retains cover 15 to canister 12 and provides a visual indication of the need to replace a spent filter element. Referring now to FIGS. 3–5, the indicator handle assembly 40 includes a cylindrical body 41, and has a handle portion, indicated generally at 42, and a mechanical indicator portion, indicated generally at 44. The handle portion 42 includes an annular collar 45 that is formed in one piece with and extends axially downward from body 41. Collar 45 has an outwardly threaded portion 46 which is dimensioned to be received within the inwardly-threaded standpipe 32. A tapered shoulder 47 interconnects body 41 with collar 45, and an O-ring seal 48 is provided around collar 45 against shoulder 47.

The handle portion 42 further includes a handle rod 50 which is supported transversely within the body 41 and can be easily grasped by the user to rotate the assembly, around its central axis. Preferably, body 41 is hollow and includes a central cylindrical chamber 52 which is connected to an internal cylindrical passage 53 extending through collar 45. Handle rod 50 extends through a pair of diametrically opposite circular openings 54 formed in body 41, and has a dimension (and geometry) such that the handle rod is closely and tightly held within the openings.

To retain cover 15 on canister 12, collar 45 is inserted through bore 36 in the cover and the handle rod 50 is rotated. The threaded portion 46 on collar 45 is screwed down through threaded portion 37 of cover 15 and through the threaded portion 34 of standpipe 32. The collar is screwed down until the tapered shoulder 47 of body 41 is seated in opening 36 of the cover, and the cover is forced against the canister. O-ring seal 48 prevents fluid leakage between body 41 and cover 15.

A transparent cup-shaped cap 80 encloses the opposite upper end of body 46. Cap 80 can be retained on body 45 in any appropriate manner, and is preferably removable. To this end, the cap 80 includes resilient fingers as at 81, which closely receive the upper end of body 41, and engage an annular channel 82 to retain the cap on the body. The cap can be easily removed from the body by grasping and pulling the cover upwardly away from the body. This makes it relatively easy to install or remove cap 80, however, it should be appreciated that other attachment techniques (removeable and non-removeable) can be used, such as threads or a press-fit, to attach the cap to the body.

The mechanical indicator portion 44 of the assembly includes an indicator button 60 closely and slideably received within chamber 52 of body 41. Preferably, button 60 has an outer, somewhat cylindrical configuration, which closely matches the inside configuration of body 41. The upper end 64 of button 60 can include fins 83 (see FIG. 5) which are received within and guide the button within cap 80. The finned upper end 64 of button 60 can be colored to facilitate readily ascertaining the position of the button through the cap.

A post 68 projects axially downward from the lower end of button 60 through the central passage 53 in collar 45. The post 68 separates into two elongated, axially-extending fingers 70, 71, each of which has a tapered end 72, 73 and an outwardly-facing catch or tab 74, 75, respectively.

The tapered ends 72, 73 of fingers 70, 71 fit closely within a radially-inward directed annular lip 77 at the distal end of collar 45. Lip 77 defines an opening 78 into passage 53. Button 60 and post 68 are preferably formed together in one piece (unitary) from appropriate material, such as plastic.

An annular, bi-directional wiper seal 85 is received around post 68, and located against the lower surface of button 60. Wiper seal 85 is closely received within body 41 and seals against the interior surface of the body as button 60 reciprocates within the body. An annular retainer washer 88 is also received around post 68, and supports the lower end of wiper seal 85. Wiper seal 85 and washer 88 are preferably retained by press-fit to post 68.

A compression spring 90 also surrounds post 68, and extends between the lower inner surface of retainer washer 68 and the inwardly-projecting lip 77 of collar 45. Spring 90 biases button 60 axially upwardly in body 46 into a "fresh element" position.

Button 60 includes an axially-elongated slot 92 extending radially through the button, and which has only a slightly wider dimension than handle rod 50. Handle rod 50 extends radially through slot 92 and orients and supports button 60 such that button 60 is rotationally fixed with respect to body 41 (i.e., such that the button has only an axial component of motion).

When the indicator handle assembly 40 is assembled with filter 10, that is when collar 45 is received in central standpipe 32, and handle 50 is rotated by the operator to secure cover 15 on canister 10, the central passage 53 in collar 45 is open and fluidly connected to the downstream (clean) side of filter element 18 through opening 35 in the standpipe. Normal operating pressure and the compression spring 90 keep button 60 in the fresh element position, with the button 60 supported against cap 80. Since cap 80 is transparent, it is easy for an operator to visually confirm the location of the button.

As the filter element 18 becomes spent, the pressure on the downstream side of the element decreases as the particulate matter is captured by the media and fluid flow is reduced through the element. When the pressure drops beyond a certain amount (which can be predetermined by the appropriate choice of compression spring), the button 60 is pulled downwardly within body 46 against spring 90. Handle rod 50 prevents the button from rotating as the button moves axially within body 41, which prevents damage to wiper seal 85.

Figure 6:
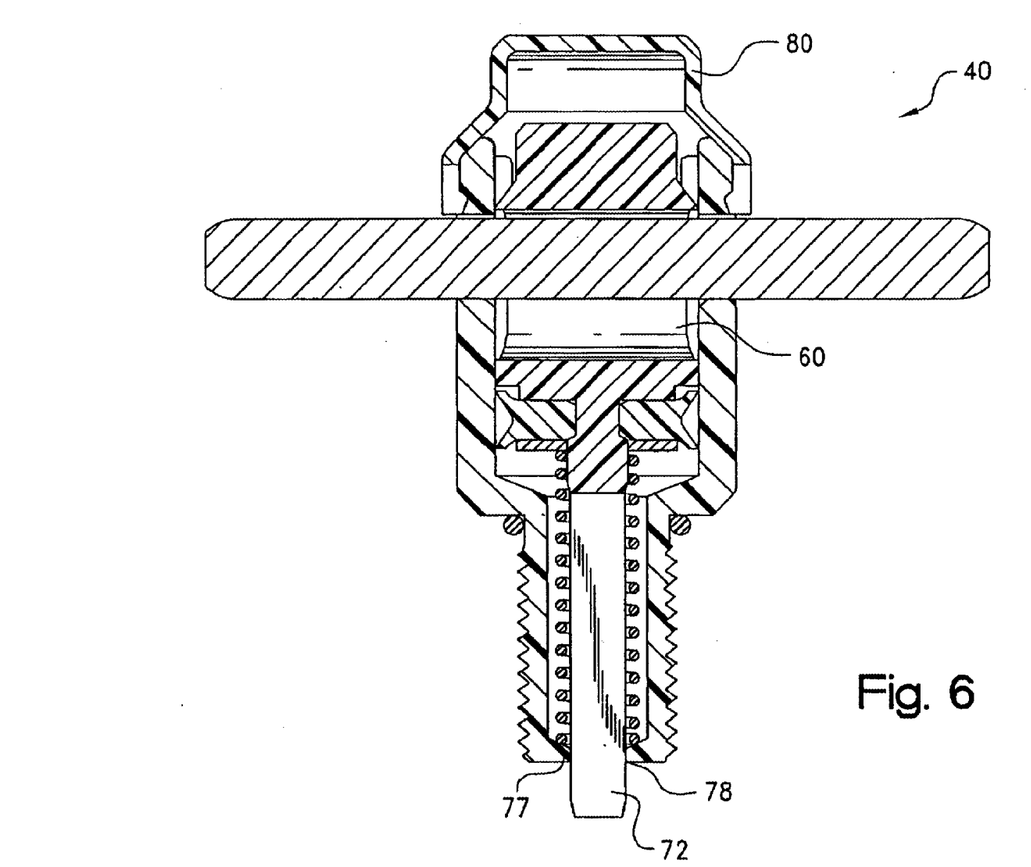
FIG. 6 is a cross-sectional enlarged side view of the indicator handle assembly similar to FIG. 3, with the indicator shown in a spent element position.
Figure 7:
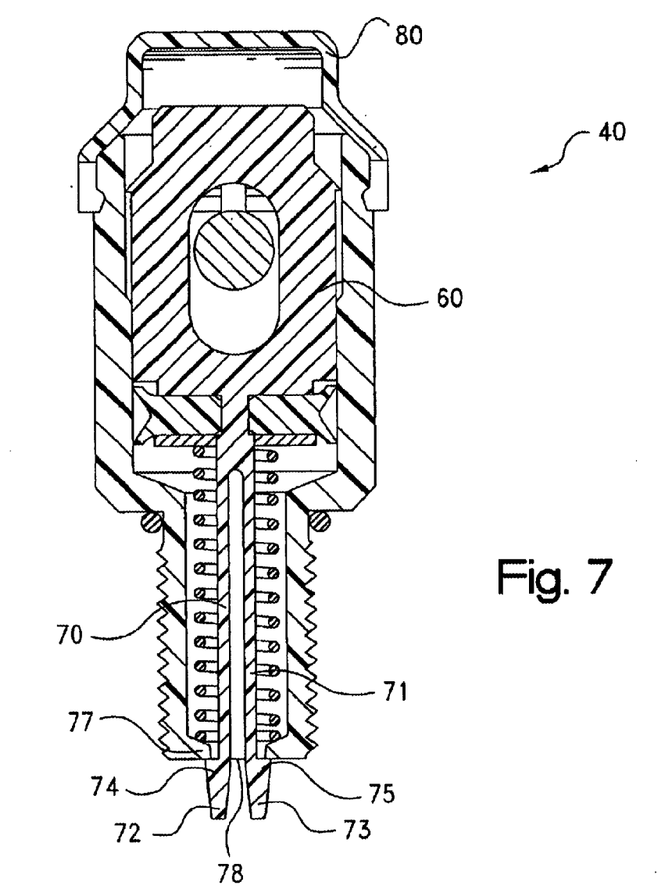
FIG. 7 is a cross-sectional enlarged side view of the indicator handle assembly of FIG. 6, shown rotated ninety degrees.

As shown in FIGS. 6 and 7, when the button is pulled downwardly, fingers 70, 71 are pushed through opening 78, with the tapered ends 72, 73 slightly compressing the fingers together until catches 74, 75 pass lip 77. At this point, the fingers 70, 71 spring outwardly and the catches 74, 75 grasp annular lip 77 to retain the button in a "change element" position. The button is retained in this position even after the fuel system is shut down. As should be apparent in FIGS. 6 and 7, button 60 has moved away from transparent cap 80, which allows the operator to easily visually confirm that the element needs to be changed.

Upon removing the indicator handle assembly 40 by unscrewing the assembly from central standpipe 32, the distal ends 72, 73 of spring fingers 70, 71 can be manually squeezed together to allow the catches 74, 75 to pass around lip 77, and the button 60 to again move back to its "fresh element" position.

Since the indicator handle assembly 40 is made of few parts, the manufacture of the assembly is simple and straight forward. The torquing force applied by handle rod 50 is absorbed by the housing 41, thereby ensuring the indicator portion of the assembly has a long operating life.

To assemble the indicator assembly 40, the compression spring 90, retainer washer 88 and wiper seal 85 are first located over central post 68, and the button 60 is inserted into body 41, with post 68 received in passage 53. Next, handle rod 50 is inserted radially through openings 54 and through the elongated slot 92 in button 60. Finally, cap 80 is attached to the opposite end of the indicator body 41 to enclose all the components in the body. To inspect or replace any of the components, cap 80 is removed and the above assembly process is reversed.

The indicator handle assembly is thereby easy to assemble and to disassemble to inspect or replace components from the indicator assembly. While a mechanical indicator is described above and shown, it is possible that the indicator could be electrical or otherwise have non-mechanical components (such as Hall-effect devices). Such an indicator would also provide the function of indicating to the operator that a filter element needs to be replaced, while conserving space on the filter cover.

Thus, as described above, the present invention provides an improved mechanical indicator for a filter, which conserves space on the cover for the filter, and which does not interfere with the operation of a T-handle.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter including a canister with a closed end an opposite open end and ports for receiving fluid to be filtered and for discharging filtered fluid; a central standpipe with a distal free end toward the open end of the canister, the distal free end of the standpipe having attachment means; a cover enclosing the open end of the canister and having a central opening; and a filter element in the canister for filtering the fluid; and further including an indicator handle assembly, the indicator handle assembly having a body with:

i) a collar extending through the central opening in the cover with corresponding attachment means which cooperates with the attachment means of the standpipe, and a handle extending through the body which can be manually manipulated by the operator to attach the indicator handle assembly to the standpipe; and ii) a device supported for movement within the indicator handle body in response to fluid pressure in said standpipe, said device providing an indication as to when fluid pressure in the standpipe falls below a predetermined value indicating that the filter element is spent and needs to be replaced with a fresh element, wherein the handle engages the device and axially guides the device within the body and prevents relative rotation of the device with respect to the body.

2. The filter as in claim 1, wherein the attachment means on the standpipe and the attachment means on the collar each comprise threaded attachment means.

3. The filter as in claim 2, wherein the body is rotatable around a central axis to screw the collar onto and off the standpipe.

4. The filter as in claim 1, wherein the body includes a central chamber with an opening at one end into the collar which is fluidly connected with the standpipe.

5. The filter as in claim 4, wherein the fluid pressure responsive device is located in the central chamber of the body.

6. The filter as in claim 1, wherein the handle comprises a rod supported transversely to a central axis of the body, and wherein the body includes a pair of openings on opposite sides of the body, and the rod is received through the openings and supported by the body.

7. The filter as in claim 1, wherein the collar is unitary with the body.

8. The filter as in claim 1, wherein the body includes a transparent cap, and the pressure responsive device can be visually inspected through the cap.

9. The filter as in claim 1, wherein the body includes a pair of openings on opposite sides of the body, and the handle is received through the openings and supported by the body.

10. The filter as in claim 1, wherein the device includes a radial slot, and the handle is received through the slot in the device.

11. The filter as in claim 1, wherein the device is spring biased.

12. A filter including a canister with a closed end and an opposite open end, and a cover enclosing the open end of the canister and having a central opening, the filter including ports for receiving fluid to be filtered and for discharging filtered fluid, a ring shaped filter element received in the canister for separating contaminants from the fluid, the canister having a central axially extending standpipe projecting from the closed end of the canister, through the filter element towards the opposite open end of the canister, the distal free end of the standpipe having a threaded portion; and further including an indicator T-handle assembly, the indicator T-handle assembly having a body with:
   i) a handle portion having a collar extending through the central opening in the cover and having a threaded portion cooperating with the threaded portion of the central standpipe to retain the cover on the canister, and a handle rod extending through the body which can be grasped by an operator and rotated to screw the indicator T-handle assembly onto and off of the central standpipe; and
   ii) a mechanical indicator portion including a button movable within the body in response to fluid pressure within the standpipe to provide a visual indication as to when pressure within the standpipe falls below a predetermined value indicating that the filter element is spent and needs to be replaced with a fresh element, wherein the handle rod engages and axially guides the button and prevents relative rotation of the button with respect to the body.

13. The filter as in claim 12, wherein the handle rod is supported transversely to a central axis of the body, and projects outwardly from the body for rotation by the operator.

14. The filter as in claim 12, wherein the body includes a pair of openings on opposite sides of the body, the handle rod being closely and tightly received in the pair of openings.

15. The filter as in claim 12, wherein the body has a central axis and the body is rotatable about its central axis to screw the collar into the standpipe, and the button is moveable along the central axis.

16. The filter as in claim 12, wherein the body includes a central chamber with an opening at one end into the collar which is fluidly connected with the standpipe.

17. The filter as in claim 16, wherein the body also has an opening at another end, and further including a transparent cap removeably attached to the body and enclosing the opening at the other end of the body, and wherein the movement of the button can be visually confirmed through the transparent cap.

18. The filter as in claim 12, and further including an annular seal between the button and the body.

19. The filter as in claim 12, wherein the body has a central axis, and the button has a slot elongated in the axial direction and extending radially through the button, and the handle rod extends through the slot in the button and is supported by the body such that the button has only axial movement within the body.

20. The filter as in claim 12, wherein the handle portion is integral with the mechanical indicator portion.

21. The filter as in claim 12, wherein the collar is unitary with the body.

22. The filter as in claim 12, and further including a spring biasing the button into a fresh element position, the button moveable against the spring into a spend element position when the fluid pressure falls below the predetermined value.

23. The filter as in claim 22, and further including a pair of catches on the button that engage the body to retain the button in the spent element position.

24. The filter as in claim 23, wherein the catches can be manually manipulated when the indicator T-handle assembly is unscrewed from the central standpipe to allow the button to return to the fresh element position.

25. A handle indicator assembly for fixing a cover to a filter canister, the handle indicator assembly comprising a body having:
   i) a collar which can be inserted through a central opening in the cover and having means for attaching the collar to a central standpipe in the canister, an internal passage through the collar to a central chamber in the body and, a handle extending through the central chamber which can be grasped by an operator and manipulated to attach the body to the central standpipe; and
   ii) an indicator device in the central chamber axially movable in response to fluid pressure received through the passage, and providing an indication as to when pressure in the passage falls below a predetermined value, wherein the handle engages and axially guides the device and prevents relative rotation of the device with respect to the body.

26. The handle indicator assembly as in claim 25, wherein the attaching means comprises screw threads.

27. The handle indicator assembly as in claim 25, wherein the handle comprises a rod supported transversely to a central axis of the body, and wherein the body includes a pair of openings on opposite sides of the body, and the rod is received through the openings and supported by the body.

28. The handle indicator assembly as in claim 25, wherein the collar is unitary with the body.

29. The handle indicator assembly as in claim 25, wherein the body includes a transparent cap, and the indicator device can be visually inspected through the cap.

30. The filter as in claim 25, wherein the pressure responsive device is spring biased.

31. A T-handle indicator assembly, comprising a body with:
   i) a handle portion including a handle rod extending through the body, a threaded collar, an internal passage though the collar to a chamber in the body; and ii) a mechanical indicator portion including a button in the chamber responsive to fluid pressure received through the passage, the button moveable within the body to provide an indication as to when pressure within the chamber falls below a predetermined value, wherein the handle engages and axially guides the button and prevents relative rotation of the button with respect to the body.

32. The T-handle indicator assembly as in claim 31, wherein the handle rod is supported transversely to a central axis of the body.

33. The T-handle indicator assembly as in claim 31, wherein the body includes a pair of openings on opposite sides of the body, the handle rod being closely received through the pair of openings.

34. The T-handle indicator assembly as in claim 31, wherein the body also has an opening at another end, and further including a transparent cap removeably attached to the body and enclosing the opening at the other cad of the body, and wherein the movement of the button can be visually confirmed through the transparent cap.

35. The T-handle indicator assembly as in claim 31, and further including an annular seal between the button and the body.

36. The T-handle indicator assembly as in claim 31, wherein the body has a central axis, and the button has a slot elongated in the axial direction and extending radially through the button, and the handle rod extends through the slot in the button and is supported by the body such that the button has only axial movement within the body.

37. The T-handle indicator assembly as in claim 31, wherein the handle portion is integral with the mechanical indicator portion.

38. The T-handle indicator assembly as in claim 31, wherein the collar is unitary with the body.

39. The filter as in claim 31, and further including a spring biasing the button into a fresh element position, the button moveable against the spring into a spend element position when the fluid pressure falls below the predetermined value.

40. The T-handle indicator assembly as in claim 31, and further including a pair of catches on the button that engage the body to retain the button in the spent element position.

41. The T-handle indicator assembly as in claim 40, wherein the catches can be removeably manipulated to allow the button to return to the fresh element position.

42. The filter as in claim 31, wherein the button is spring biased.

* * * * *